United States Patent [19]
Aplet et al.

[11] 3,722,769
[45] Mar. 27, 1973

[54] TENSION CONTROL SYSTEM

[75] Inventors: Everett Lloyd Aplet, Everett; Thomas J. Reynolds, Seattle, both of Wash.

[73] Assignee: Western Gear Corporation, Seattle, Wash.

[22] Filed: Feb. 11, 1971

[21] Appl. No.: 114,461

[52] U.S. Cl. ............................ 226/25, 226/195, 226/42, 318/6
[51] Int. Cl. ............................................. B65h 23/22
[58] Field of Search ........ 226/195, 25, 42, 44, 40, 30, 226/24; 318/6

[56] References Cited

UNITED STATES PATENTS

| | | | |
|---|---|---|---|
| 3,561,654 | 2/1971 | Greiner | 226/25 |
| 3,485,427 | 12/1969 | Busker | 226/195 X |
| 3,087,663 | 4/1963 | Anderson | 226/195 UX |
| 3,539,085 | 11/1970 | Anderson | 226/178 X |
| 3,613,975 | 10/1971 | Knight | 226/195 |
| 3,469,751 | 9/1969 | Tyrner et al. | 226/25 |
| 3,533,244 | 10/1970 | Shaw | 226/195 X |
| 3,480,191 | 11/1969 | Van Os | 226/195 X |

*Primary Examiner*—Allen N. Knowles
*Attorney*—Seed, Berry & Dowrey

[57] ABSTRACT

A tension control system for use in conjunction with an apparatus for feeding an elongated object such as a pipe or wire including a variable speed motor means for controlling the speed at which the object is being fed, and a means for preselecting the range of tension to which the object may be safely subjected. The system further includes a means for accurately measuring the tension to which the object is subjected and varying the speed of the feed in accord therewith to maintain the tension within the predetermined limits.

10 Claims, 2 Drawing Figures

TENSION CONTROL SYSTEM

BACKGROUND OF THE INVENTION

It is imperative that when stringing wires either above ground or below the ground as well as laying pipelines beneath the water that the tension to which the object is subjected is kept within close tolerances. For example when laying a pipe beneath water the catenary formed between the pipe already resting upon the bottom surface and the pipe leaving the barge or other pipe laying vessel must not be allowed to become sharp which would cause a rupture of the walls or the protective surface, which is usually applied to these pipes, and the tension must not get to be too great such that either the pipe fractures at a weak point or the portion which has already been layed is caused to shift in its position. With the above noted problems in mind it is an object of the present invention to provide a control system whereby the tension of an elongated object being fed can be predetermined and kept within the predetermined limits.

Another object of the present invention is to provide a control system for maintaining a constant tension upon an elongated object being fed by accurately sensing a change in tension upon the object and adjusting the speed at which the object is being fed to keep the tension within the present limits.

A further object of the present invention is to provide a means and system for controlling the tension of an elongated object being fed whereby the speed at which the object is being fed is sensed and serves as a feedback system to the control system whereby the correction is proportional to the speed.

DETAILED DESCRIPTION OF THE DRAWINGS

Figure 1:
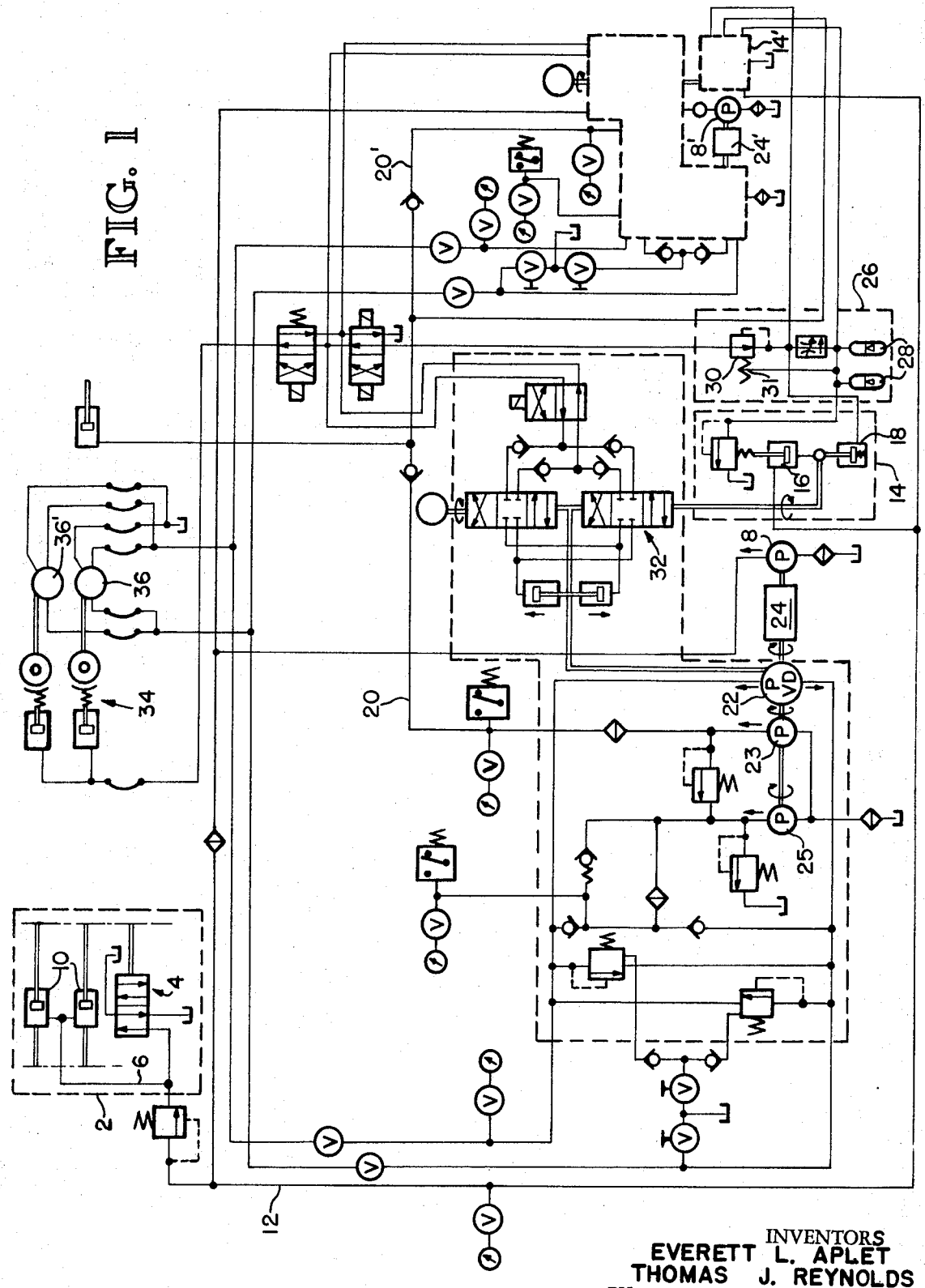
FIG. 1 is a schematic of the hydraulic circuit for the tension control system.
Figure 2:
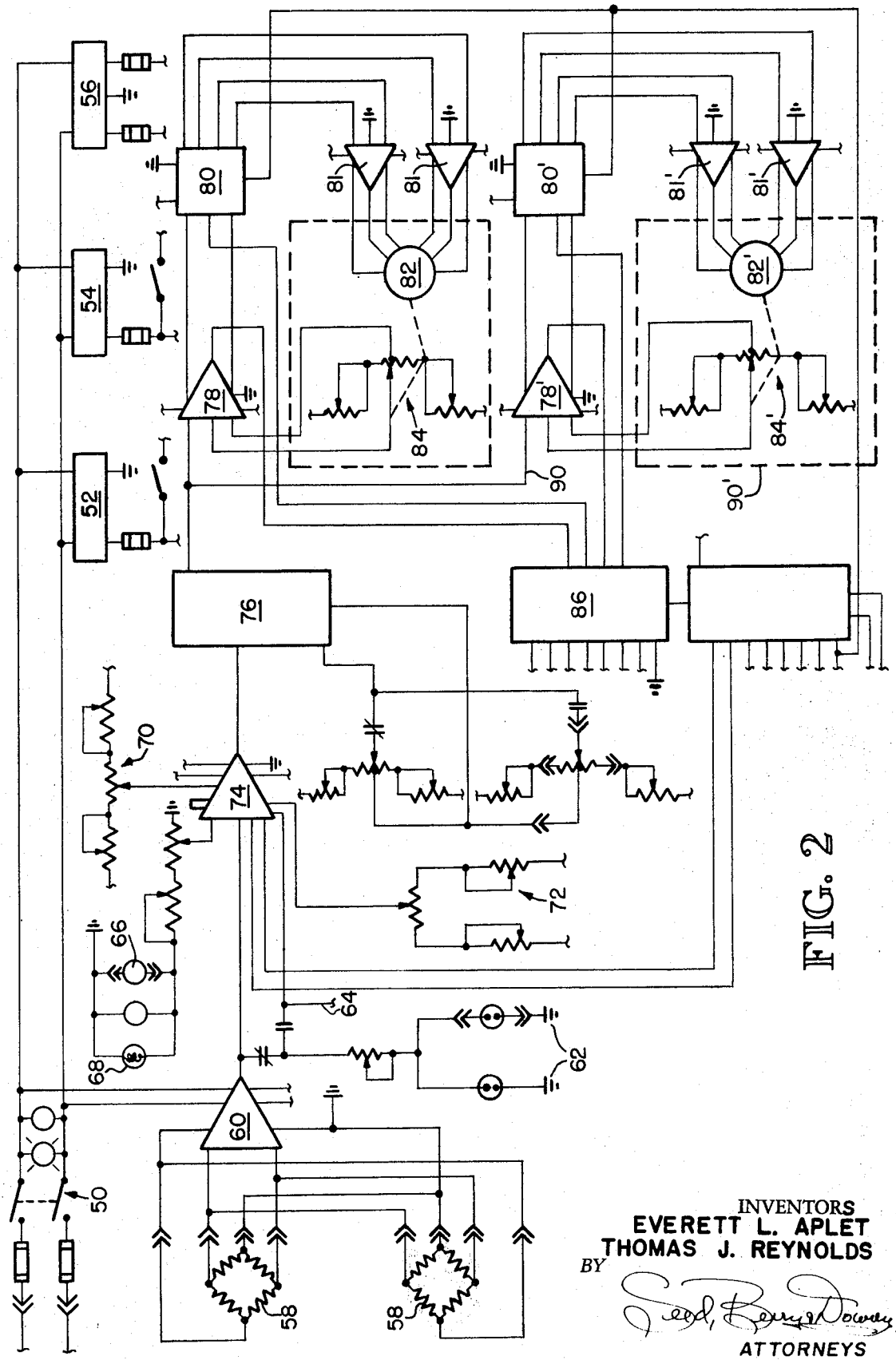
FIG. 2 is an electronic diagram for the tension control system.

FIGS. 1 and 2 are somewhat repetitive as to portions within the figure because the preferred embodiment of the inventive control system uses a pair of independent power sources for driving a pair of identical pumps which in turn drive a hydraulic motor connected to a set of tracks in a pipe tensioning unit such as disclosed in co-pending U.S. patent application Ser. No. 85,951 filed Nov. 2, 1970, PIPE TENSIONING UNIT, Blancette et al, now U.S. Pat. No. 3,669,329. As was disclosed in the above noted application the purpose for two independent power sources as well as two hydraulic motors and pumps is to provide the ultimate reliability for that particular unit. The present invention deals with a control system for use on such mechanisms wherein the tension upon the object being laid must be kept under very careful control to avoid rupture either because of the sharpness of the curve of the catenary or the tension placed on the object itself.

Similarly, as disclosed in the above noted application a pair of independent control systems have been devised for maintaining the unit in operation. Each of the systems is independent of the other and each of the systems can operate the unit functioning separate from the other system. In the preferred embodiment, disclosed in the above noted application, the electronic mode of operation is the primary mode with the hydraulic mode being a backup. The system is set up within the preferred embodiment that an electronic failure will automatically switch the mode to hydraulic thereby keeping the pipe tensioning unit continuously operating.

As can be seen in the upper left hand portion of FIG. 1 the tension sensing mechanism or tension signal generator 2 senses a change in the tension upon the object under surveilance (pipe being laid) and a change in the tension will move the valve 4 thus changing the pressure within the line 6. The pressure in line 6 is maintained by pumps 8 and 8' and the pressure change resulting from the movement of the valves 4 causes a pair of identical cylinders 10 to move the mechanism back to its neutral position. Simultaneously, with the change of pressure in line 6 there is a change in pressure in line 12. Line 12 is functionally connected to the assemblage in the square areas 14 and 14' which serve as dampening compensators. Any change in the control pressure in line 12 acts upon the piston 16, causing it to react against the reference pressure in cylinder 18. The pistons of the two cylinders 16,18 are spring self centered. For purposes of illustration the varying surfaces of the two cylinders in the preferred embodiment disclosed in the above noted patent application are such that 340 lbs. of control pressure on one set of pistons will balance a 160 lb. reference pressure acting upon the other side of the piston, the particular values involved varying depending upon the size of the cylinder, the capacity and the particular application for which the surface is designed. The reference pressure is supplied via lines 20–20' by servo pump 22 driven by diesel engine 24 serving as the prime mover. The arrangement of the pistons with the varying effective surfaces in combination with the self centering springs and the compensator 14 makes the system responsive to changing conditions and cuts down upon the gain rate of amplification making it a proportional relationship. Without the spring self centering force, any change in pressure in line 12 acting upon cylinder 16 would cause a full stroke reaction engendering an immediate full stroke return with eventual disasterous results whereas the compensator in the preferred embodiment requires a variance of 25,000 lbs. from the preselected tension before there is a full stroke reaction. The compensating reaction is proportional between 0 lbs. variance and the 25,000 lbs. The area enclosed in box 26, which is a reference and correction circuit, includes accumulators 28 and a flow control valve 30. The flow control valve 30 serves as an adjustable tension set and is so connected to the hydraulic system that a change in pressure at the drain port 31 varies the setting on the valve. The accumulators 28 serve to slow down the signal or feedback from the pump 22 prior to the signal reaching the relief valve 30, thus making the system inherently more stable. It is to be understood that the size of the the accumulators and/or the centering springs may well be varied for a system requiring a different rate of response.

Movement of the cylinders 16 and 18, which are hydraulically linked by means of a rotary servo valve 32 to the swashplate of the variable pump 22 caused the speed of the tensioning equipment to increase or decrease in direct relationship to the movement of the plate thus compensating for any error felt by the sensing mechanism. Thus it can be seen that the slightest movement of the tension sensing mechanism will result in an immediate change in the speed of feed thus assuring a constant tension upon objects handled by the machine so controlled. The control system has included therein a dampening factor to preclude over compensation and the control pressure can be varied to accommodate various objects having different tensile strength.

Since the preferred embodiment as shown would be used in conjunction with a pipe laying device a brake 34 is included. The brake is spring loaded requiring fluid pressure to maintain the release position. In the event of failure of the control mechanism causing a loss of pressure the brake will instantly be engaged preventing damage to either the equipment or material.

As can be seen in the figure the power source 24-24' drives the variable pump 22 which in turn drives hydraulic motors 36-36' as well as servo pump 23 and the replenishing pump 25 assuring a constant volume of hydraulic fluid within the system.

It is believed that the above description of the hydraulic control is a complete and workable embodiment such that a person skilled in the art may perform the invention but it is further to be understood that it is well within the contemplate of the present invention that a control system not be limited to hydraulics but could equally well be electronically controlled. In fact, in the preferred embodiment i.e. the pipe tensioning device described in the co-pending application hereinabove noted includes a hydraulic control system and an electrical control system one serving as the backup for the other such that if there was a failure in one system the device would continue to operate. In the interest of clarity and completeness a brief description of an electrical system which performs the exact same control functions will hereinafter be given.

In the interest of simplicity only those parts that are essential to the understanding of the electronic circuit will be given in detail and those portions felt to be capable of design by a person skilled in the art will be referred to in a general fashion.

Referring now to FIG. 10 a main power supply is shown in the upper lefthand portion of the diagram and includes a switch 50 which has connected thereto step down transformers 52 through 56 providing the lower voltages necessary for the various control elements. To the left of the figure a pair of load cells 58 can be seen which are designed to be mounted to the tensioning device and generate a small voltage when actuated by movement of the tensioning device. A small voltage generated by the load cells 58 is fed to an amplifier 60 which increases the signal to a usable quantity. The signal from the amplifier 60 as well as the input signals from the tension indicators 62, the tension set input 64, the pipe feed indicator 66 including the tachometer generator 68, and the infinitely adjustable dead band having an upper level adjustment 70 and a lower level adjustment 72 enabling variable tolerances to be set at either end of the acceptable limit are all fed into amplifier 76. The output signal of amplifier 76 is simultaneously fed to amplifiers 78-78' which trigger a generator and regulstes the pulse rate fed to logic cards 80 and 80'. The signal from logic cards 80-80' is again amplified and fed to stepper motor 82-82'. The stepper motor is monitored by feedback pots 84-84' which provide yet another input into the amplifier 78-78'. Signals from the amplifiers 78-78' and logic cards 80 and 80' are fed to fail safe monitor 86 which in response to the signal will allow the mechanism to continue operation, switch to the hydraulic mode of operation or stop the entire unit and indicate the problem.

For purposes of the summary to follow the elements located within the square 90 and 90' will be referred to as the power servo actuator.

In summary, when the controls are in the speed mode the operator directly controls speed and direction of feed. The command is in the form of a voltage signal from the pot which passes through the monitor 76 to amplifier 78. The signal is amplified and applied through logic card 80 to amplifier 81 or 81' which drives the servo actuator in the required direction. Movement of the servo actuator moves the wiper of the feedback pot 84 or 84' and the voltage of the wiper is applied back through amplifier 78-78'. If the feedback voltage is equal to the command voltage the command signal is cancelled and the system remains stable.

In the tension mode the tension set voltage from the tension set pot is fed to amplifier 74 from which the signal is applied to the servo actuator. The input signal from the load itself is applied through amplifiers 60 to another input amplifier card 74. When the tension set voltage and the load input voltage are equal a null balance within the amplifier occurs. When the load cells are varied due to any change in the relationships an error voltage is generated and sent to amplifier 74 which unbalances this amplifier and the servo actuator is triggered to adjust the rate of feed of the object until a null balance occurs in the amplifier. The input from the tach generator is used to build error into the system.

Normally when the command sets the tension and the speed, a servo actuator will respond and once the command valve is reached there would be no error signal and the mechanism would stop. It is desirable to have the machine run in a continuous fashion so the tach generator builds in a continuous error which varies with the speed of operation whereby the system is more rapidly responsive at a higher rate of operation. The built in error has an added attribute in that the continuous error causes continuous operation.

In summary within the preferred embodiment as applied to the mechanism in the co-pending patent application hereinabove referred to, the prime mover will drive the variable pumps controlling the hydraulic motor and thusly the speed at which the pipe is fed. In the event of the failure of one of the two prime movers the control system is such that the other can carry the operation at a reduced speed. The speed is automatically controlled within the vicinity of the present tension value by the control system hereinabove described including both electrical and hydraulic systems. In the event of an electronic failure the hydraulic system automatically takes over in the event of failure of both systems the brake is automatically set.

The embodiments of the invention in which an exclusive property or privilege is claimed are defined as follows:

1. A tension control system comprising:

control means whereby an operator may preset the upper and lower limits of the allowable tension, variable speed power means for maintaining the tension upon an object subjected to such tension, means responsive to variance in tension to adjust the speed of the power means either increasing or decreasing same to again return the tension to the predetermined value, means responsive to the speed of the power means to modulate the speed adjustment whereby the rate of change in speed varies with the speed of operation.

2. A tension control system as in claim 1 and further including means interconnected with said power means to longitudinally feed the object under tension and wherein the change in tension is accomplished by a change in the speed at which the object is being fed.

3. A tension control system as in claim 1 wherein the rate at which the tension is varied is directly related to the speed at which the object is being fed.

4. A tension control system as in claim 1 wherein the mode of operation of said system is hydraulic.

5. A tension control system as in claim 1 wherein the mode of operation of said system is electronic.

6. A tension control system as in claim 1 wherein the mode of operation includes an electronic system and a hydraulic system in parallel wherein each mode is independent and serves as a backup for the other system.

7. The tension control system for use with a device for laying underwater pipe or other similar, relatively stiff objects which includes a means for feeding the object being laid at a variable predetermined speed, means for measuring the tension upon the object and means for measuring the speed at which the object is fed comprising; control means for presetting the desired tension and the maximum and the minimum allowable tension, means responsive to the tension measurement and the rate of speed to keep the tension within the preset limits.

8. A tension control system as in claim 7 wherein the tension is controlled by varying the rate at which the object is being fed, increasing the speed to lessen the tension and decreasing the speed to increase the tension.

9. A control system as in claim 7 wherein the system is responsive to the amount by which the measured tension varies from the preset desired value whereby the system introduces a greater correction factor the greater the difference is between the two values.

10. A control system as in claim 7 and further including means to continuously introduce an error into the system such that the system is continuously operating.

* * * * *